Figure 1:
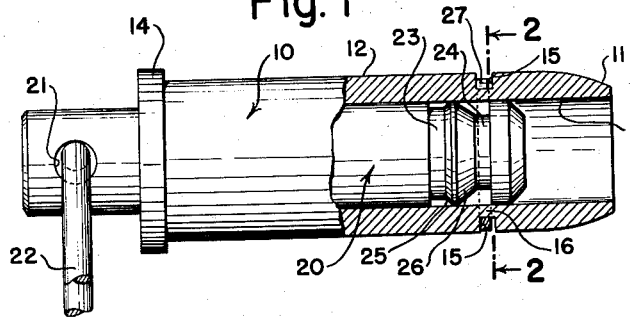

Dec. 23, 1958 R. W. NEWTON ET AL 2,865,076
QUICK RELEASE SELF-LOCKING SHEAR PIN
Filed Feb. 16, 1954

INVENTORS
Harold E. Koch
BY Richard W. Newton

ATTORNEY

United States Patent Office 2,865,076
Patented Dec. 23, 1958

2,865,076

QUICK RELEASE SELF-LOCKING SHEAR PIN

Richard W. Newton, Lake Ronkonkoma, and Harold E. Koch, Lindenhurst, N. Y., assignors to Harold E. Koch, Lindenhurst, N. Y.

Application February 16, 1954, Serial No. 410,546

7 Claims. (Cl. 24—211)

This invention relates to fastening devices and more particularly to a pin capable of locking sheets and other forms of rigid material together, but also capable of being quickly and easily removed from its locking position to release the material so held.

A common means for joining materials together is by passing rivets through rivet holes in each of the materials to be joined. Securing of the rivets in place then results in a permanent bond. Where it is desired to join extensive sheets of material by riveting, however, it may be necessary to hold the rivet holes in temporary alignment before riveting by a means having the same diameter as the rivet holes, so that true alignment of the materials will result. It is an object of this invention to provide such means. Furthermore, upon removal of the temporary locking device here prescribed, the device is not destroyed, but may be reused. It is a further object of this invention to provide a temporary locking device having this characteristic. It will be apparent that a device of the character described may be applied in uses where permanent fastening would be unappropriate, and yet stringent dimensional requirements in locking materials together are necessary. Such a use might arise where it was desired to hold a part in one place in a structure at one time, and yet be ready for a contingency which would require shifting of the part to another position within the structure at another time.

Still another problem in the fastening together of materials may be met most admirably by the present invention. The ordinary process of riveting two sheets of material together requires that the material be accessible from both sides, the rivet being held in place from one side, and secured in place on the other. But not always does the condition of accessibility from both sides prevail. The present locking device may be both introduced and secured from one side of the work, and, indeed, released from the same side. A locking device introducible, fastenable, and releasable from one side of the materials to be joined together is still another objective of this invention.

It is proposed that the requirements set forth above may be met by a pin which may be introduced through holes cut into the material to be joined. The pin has an outer casing with a diameter proper for accurate fitting into the holes in the material. Within the outer casing are internal means axially disposed with respect to the casing, which are capable of being actuated after the casing has been inserted through the holes, to present an obstacle to removal of the pin from the fastened materials. The internal means extend beyond the casing at one end thereof, and it is by means of this extension that the internal means may be controlled.

Devices of this character are not entirely new, but those which are now available are generally relatively expensive because of their complicated construction. A final object of this invention is to provide a locking device of the character described which is materially less expensive than those now available, yet which is fully capable of performing its function as well.

Figure 2:
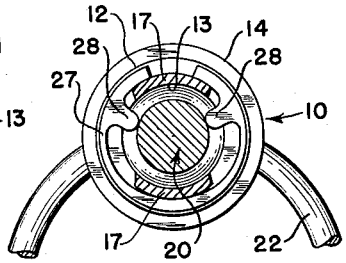
Figure 3:
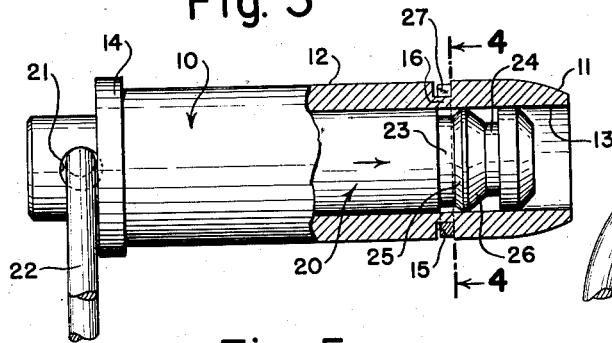
Figure 4:
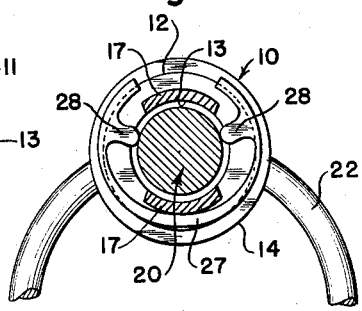
Figure 5:
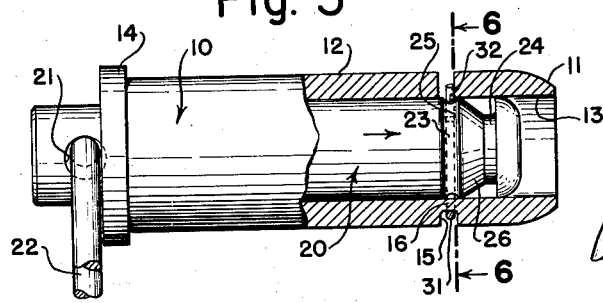
Figure 6:
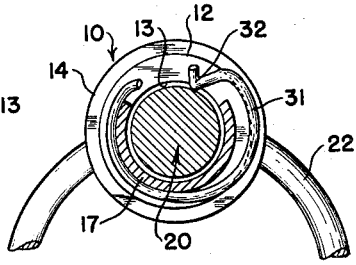

How these and other objects are to be implemented will become apparent through a consideration of the accompanying drawings wherein:

Fig. 1 shows a side view of a first embodiment of the invention, with a portion of the outer casing broken away to show a portion of the interior components, Fig. 2 is a section taken at 2—2 of Fig. 1, Fig. 3 is a similar side view of the same embodiment shown in Fig. 1 with interior components in a different position, Fig. 4 is a section taken at 4—4 of Fig. 3, Fig. 5 is a side view of a second embodiment of the invention with a portion of the outer casing broken away to show a portion of the interior components, and Fig. 6 is a section taken at 6—6 of Fig. 5.

Each pin is composed of an outer casing 10 having a tapered external end portion 11 for ease of introduction into an opening, as well as interior components. The casing is hollow, having an external surface 12 and an internal surface 13, and has a shoulder 14 at one end for abutting against the surface of a sheet or other material into which the pin may be inserted. A circumferential channel 15 is cut into the casing, the channel opening into external surface 12, so that a thin wall 16 remains between the bottom of channel 15 and internal surface 13. Portions of this wall are removed, and where the wall is so removed, the bottom of channel 15 opens directly into the interior of the casing, intersecting internal surface 13. The portions of wall 16 remaining are designated 17.

In the embodiment shown in Figs. 1, 2, 3 and 4 there is a plunger 20 within the casing, the plunger having a hole 21 in one end thereof, that end projecting beyond the casing, and a handle 22 in the form of a ring or other convenient shape for ease in grasping, passing through hole 21. The other end of plunger 20 as shown in Figs. 1 and 3 has channels 23 and 24 cut therein, channel 24 being cut deeper than channel 23. Channel 23 has an inclined side wall 25, and channel 24 has an inclined side wall 26, walls 25 and 26 sloping toward each other. A split annulus 27 having a gap therein rests within channel 15. The annulus 27 is formed with protuberances 28 as integral parts thereof, the protuberances projecting into the interior of the casing through the spaces left where portions of wall 16 have been removed. Protuberances 28 may project into either channel 23 or 24.

The operation of one embodiment by this invention may be described by reference to Figs. 1, 2, 3 and 4. Figs. 1 and 2 illustrating this embodiment with the annulus 27 contracted to permit insertion or withdrawal of the locking pin, and Figs. 3 and 4, illustrating the distended locking position of the annulus 27. In Figs. 1 and 2 plunger 20 is in the position shown in which protuberances 28 project into deep channel 24. In this position, no part of annulus 27 extends above external surface 12 of the casing. But when the plunger 20 is pushed into casing 10 in the direction of the arrow seen in Fig. 3, the protuberances are displaced so that they now project into shallow channel 23. Inclined wall 25 of channel 24 aids materially in permitting transposition of the protuberances into channel 23. When so transposed, the effect of the bottom surface of channel 23 bearing on protuberances 28 is to cause expansion of the entire split annulus 27, so that now the annulus projects above external surface 12 of casing 10. In such position, the pin may not be withdrawn from an aperture into which it was inserted when annulus 27 occupied the position shown in Figs. 1 and 2 by reason of the obstacle presented by the expanded annulus.

The embodiment shown in Figs. 5 and 6 is shown only in its locking position, for its operation and structure is substantially similar to that previously described. There is no annulus, but instead, a circular spring 31 having the configuration shown, which rests within channel 15. An inwardly bent portion 32 of spring 31 projects through the opening left where a portion of wall 16 has been removed, into the interior of the casing. Bent portion 32 may thus project into either channel 23 or 24, depending upon the position of plunger 20.

The structure of the third embodiment illustrated in Figs. 7, 8 and 9 is somewhat different from that heretofore described.

While we have described several specific embodiments of our invention, it is apparent that changes and modifications may be made therein without departing from the spirit of our invention.

We claim:

1. A locking pin comprising a hollow outer casing having an external surface, an internal surface, and a circumferential channel therein opening into said external surface, a member within said channel extending above said external surface, said member being distortable to a position below said external surface, and also distortable from a position below to a position above said external surface, and slidable means for causing distortion of said member, said member and said means being in contact through an opening in the bottom of said channel.

2. A locking device as claimed in claim 1 wherein said casing is tubular.

3. A locking pin comprising a hollow outer casing having an external surface, an internal surface, and a circumferential channel opening into said external surface, an annulus having a gap therein within said channel, said annulus being distortable from a position in which it extends above said external surface to a position below said external surface, and also distortable from a position below to a position in which said annulus extends above said external surface, and slidable means for causing distortion of said annulus, said annulus and said means being in contact through an opening in the bottom of said channel.

4. A locking pin comprising a hollow outer casing having an external surface, an internal surface, and a circumferential channel opening into said external surface and having also holes in the bottom thereof intersecting said internal surface, an annulus having a gap therein and inwardly disposed protuberances thereon, said annulus being situated within said channel and being distortable from a position in which it extends above said external surface to a position below said external surface, and also distortable from a position below to a position in which said annulus extends above said external surface, and a plunger axially slidable within said casing, and having stepped circumferential protuberance engaging grooves therein and tapered circumferential surfaces contiguous to said grooves, said protuberances contacting said plunger through said holes, and means for causing sliding motion of said plunger.

5. A locking pin comprising a hollow outer casing having an external surface, an internal surface, and a circumferential channel opening into said external surface, and having a passageway between the bottom thereof and said internal surface, a spring within said channel, said spring being distortable from a position in which it extends above said external surface to a position below said external surface, and also distortable from a position below to a position in which said spring extends above said external surface, and slidable means for causing distortion of said spring, said spring and said means being in contact through an opening in the bottom of said channel.

6. A locking pin as claimed in claim 5 wherein said casing is tubular and said spring is circular.

7. A locking pin comprising a hollow outer casing having an external surface, an internal surface, and a circumferential channel opening into said external surface, and having a passageway between the bottom thereof and said internal surface, a circular spring within said channel having an inwardly disposed arcuate portion therein, said arcuate portion extending through said passageway, a plunger axially slidable within said casing, and having a circumferential groove therein for displaceably engaging said arcuate portion of said spring and means for causing sliding motion of said plunger.

References Cited in the file of this patent

UNITED STATES PATENTS

| | | |
|---|---|---|
| 759,410 | Vandenberg | May 10, 1904 |
| 809,587 | Sussman | Jan. 9, 1906 |
| 1,086,764 | Greenebaum | Feb. 10, 1914 |
| 1,247,411 | Laible | Nov. 20, 1917 |
| 1,418,329 | Schade | June 6, 1922 |
| 1,719,891 | Kuhl | July 9, 1929 |
| 1,737,537 | Johnson | Nov. 26, 1929 |
| 1,803,485 | Peters | May 5, 1931 |
| 2,472,651 | Diaper | June 7, 1949 |